United States Patent [19]

Petzold

[11] 4,342,273

[45] Aug. 3, 1982

[54] MATERIAL SENSING MEANS FOR SEWING MACHINES

[75] Inventor: W. Andreas Petzold, Überlingen, Fed. Rep. of Germany

[73] Assignee: Union Special G.m.b.H., Stuttgart, Fed. Rep. of Germany

[21] Appl. No.: 181,322

[22] Filed: Aug. 25, 1980

[30] Foreign Application Priority Data

Sep. 1, 1979 [DE] Fed. Rep. of Germany ....... 2935473

[51] Int. Cl.³ .............................................. D05B 69/00
[52] U.S. Cl. .................................................... 112/272
[58] Field of Search ................... 112/272, 121.11, 235, 112/121.12, 220, 221

[56] References Cited

U.S. PATENT DOCUMENTS

| | | | |
|---|---|---|---|
| 2,979,745 | 4/1961 | Schaefer, Jr. et al. | 12/55 |
| 3,650,229 | 3/1972 | Rovin | 112/121.11 |
| 3,924,550 | 12/1975 | Boser et al. | 112/272 X |
| 4,226,197 | 10/1980 | Pollmeier et al. | 112/121.11 |

Primary Examiner—Peter P. Nerbun
Attorney, Agent, or Firm—John W. Harbst; John A. Schaerli

[57] ABSTRACT

A device for monitoring the passage of workpiece ends through a sewing machine. The device includes a photosensitive apparatus adapted to produce a signal in response to the passage of the workpiece ends past the end of a fiber optic light source.

3 Claims, 3 Drawing Figures

MATERIAL SENSING MEANS FOR SEWING MACHINES

FIELD OF THE INVENTION

The invention relates to an apparatus for monitoring the passage of a workpiece through a sewing machine.

BACKGROUND OF THE INVENTION

There are many applications which require the generation of a signal when a workpiece arrives at a predetermined location. Sensor arrangements for scanning flat, sheet like material workpieces as they progress through a sewing machine are known in many variations.

Some machines employ mechanical means for detecting the workpiece edge. Mechanical sensor arrangements, however, have been known to be particularly sensitive and/or delicate and are susceptible to malfunction. Also, mechanical sensors are subject to wear as well as vibration. Some mechanical sensors are too insensitive to detect the movement of a single ply workpiece and, thus, do not provide the reliability required in some operations.

In contrast to mechanical sensors, it has been known to use optical scanners or sensors for detecting the workpiece. Such optical sensors, however, also have drawbacks associated therewith. Optical sensors are usually sensitive to light dispersion and differing material density. Further, many optical sensors are sensitive to ambient light. Moreover, the environment in which this type of apparatus finds utility is usually laden with dust and lint, both of which may effect the efficiency of such sensors. Photocells are usually not employed in the immediate area of sewing because of the vibratory surroundings which prohibit their use. Furthermore, disturbances with light sensors may arise if the operator inadvertently interrupts the light beam, thus producing incorrect detection signals.

Some devices employ air sensors for detecting the workpiece. These also have drawbacks. As mentioned above, the environment in which these sensors find utility is laden with dust and lint. Many of the machines are also exposed to some lubricant, which, when combined with the dust and lint in the area, easily clog the air sensor arrangements, and thus effect the reliability of same.

SUMMARY OF THE INVENTION

Hence, it will be recognized that this particular field of technology is still in need of an apparatus for monitoring the progressive advancement of a workpiece and which is not associated with the aforementioned drawbacks and limitations of the prior art proposals. In view of the above, and in accordance with the present invention, there is provided a material sensing means which overcomes all of the aforementioned drawbacks. The sensing means of the present invention includes a fiber optic light guide that is arranged on one side of the workpiece path and in close proximity to the sewing area of the machine. A reflecting surface is arranged opposite the fiber optic light source. Photoelectric means are connected to the other end of the fiber optic light guide at a position removed from the sewing area and are capable of generating a pulse or signal when the workpiece interrupts the light path between the fiber optic means and the reflective surface. This output signal of the photoelectric means may be used for any of a variety of purposes, i.e. actuation of a thread cutter, actuation of a tape trimming apparatus, etc.

The advantages of the present invention over the known sensor arrangements is that the fiber optic arrangement of the present invention is not effected by the vibratory surroundings in which it operates. The fiber optic system delivers the light medium directly to the machine area and is unaffected by inadvertent operator interference. The fiber optic light source is flexible such that it may be mounted to a movable member. Another advantage is since the sensing element of the fiber optic system is usually fragile, it may be located an extended distance from the machine's functioning area. Unlike photocells, the fiber optic light source is relatively insensitive to machine vibration and may be arranged in the immediate sewing area of the machine. In addition, the fiber optics of the present system allow transmission of the light without dispersion or distortion.

It is therefore a primary object of this invention to provide a simple, efficient apparatus for monitoring the progressive advancement of a workpiece through the machine.

BRIEF DESCRIPTION OF THE DRAWINGS

Having in mind these and other attendant advantages, that would be evident from an understanding of this disclosure, the invention comprises the devices, combinations, and arrangements of parts as illustrated in the presently preferred embodiment of the invention which is hereinafter set forth in detail so as to enable those skilled in the art to readily understand the functions, operation, construction, and advantages of it when read in conjunction with the accompanying drawings in which.

DETAILED DESCRIPTION OF THE PREFERRED EMBODIMENT

Figure 1:
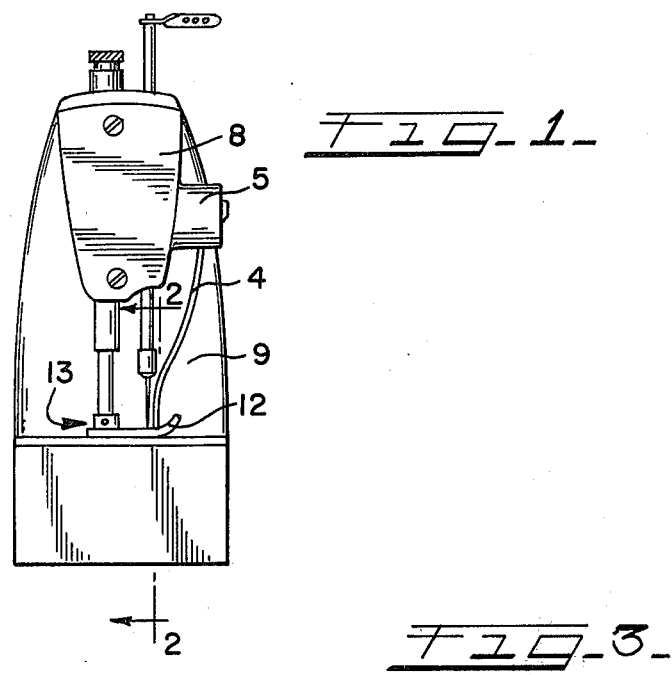
FIG. 1 is a side elevational view of one variety of industrial sewing machine fitted with the present invention.
Figure 2:
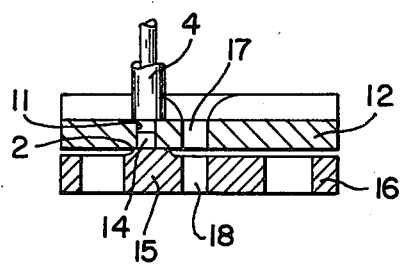
FIG. 2 is an enlarged sectional view taken along line 2—2 of FIG. 1.
Figure 3:
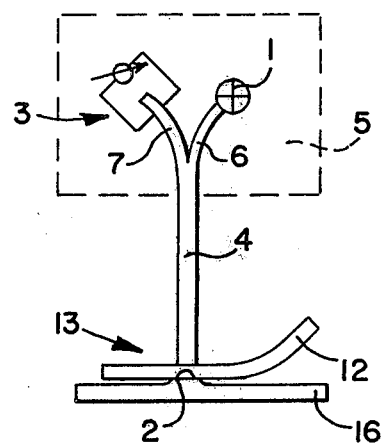
FIG. 3 is a schematic side elevational view of the present invention.

Referring now to the drawings wherein like reference numerals indicate like paths parts throughout the several views, there is shown a conventional industrial sewing machine 9. Secured to the head 8 of the machine 9 is a casing 5 which houses some of the components of the present invention.

The apparatus of the present invention includes a sensor means 4 which is in the form of an extended, flexible fiber optic light guide. The end of the light guide arranged within housing 5 is split into a plurality of leads or branches 6 and 7. One branch or lead is associated with a light source 1 and the other lead is connected to a photosensitive receiver 3. The light source 1 is adapted to emit a beam of light which is transmitted, without dispersion, by the fiber optic means to the machine sewing area. Accordingly, reflected beams of light are similarly returned through the branch 7 and, hence, upon the photosensitive receiver 3. As will be described hereinafter, the photosensitive means 3 are capable of producing a signal in response to the interruption and restoration of light shed thereupon.

The other end of the light guide 4 is arranged adjacent one side of the path of workpiece travel and opposite a reflecting surface 2. In the preferred embodiment, and because of the flexibility of the optic fibers, the free end of the light guide 4 may be accomodated and held within an aperture 11 provided in the sole plate or member 12 of a presser foot assembly 13. In this manner, the end of the fiber optic means is maintained in close proximity to the reflecting surface 2. The end of the fiber optic means may be arranged flush with the bottom surface of the sole plate 12 and, thus, in contact with the workpiece as it advances through the sewing area. Preferably, a transparent insert 14 is interposed between the end of the optic guide and the reflecting surface 2. The transparent insert 14 may be arranged flush with the bottom surface of the presser foot sole such that, as the workpiece moves through the sewing area, it wipes clean the insert. The characteristics of the fiber optics allow the sensing means to be positioned in close proximity to the sewing area of the machine defined by the needle apertures 17, 18, provided in the presser foot assembly 13 and the throat plate 16, respectively.

Opposite the insert 14 lies the reflecting surface 2. In the preferred embodiment, the reflecting surface 2 is formed as an upstruck surface or boss which may project from a web or crosspiece 15 provided on the throat plate 16. Preferably, the cross-sectional area of the reflecting surface 2 is greater than the cross-sectional area of the light guide 4. In this manner, the pressure of the presser foot assembly 13 may be transferred over the presser foot sole surface rather than directly to the insert 14 or fiber optic means.

In operation, a workpiece is progressively moved past the sewing area of the machine by any well-known feed mechanism means (not shown). At the instant the leading edge of the workpiece interrupts the light path defined by the space between the fiber optic light source and the reflecting surface, the photosensitive means 3 become energized. As a result, a pulse is produced thereby. Said pulse may be used to timely energize any one or a plurality of mechanisms, i.e. a thread cutter means, a tape cutting apparatus, etc. Upon continued operation of the machine, the advancing work blocks the sensor means light path. Therefore, while the work is progressively moved through the sewing area, no pulse may be produced by the photosensitive means 3. The instant the trailing edge of the work passes beyond the sensor means light path, the photosensitive means may again be energized in response to the receipt of light conducted by the optic fiber from the reflecting surface to the photosensitive means 3. Again, the second pulse may be used for any one of a plurality of purposes.

Thus it is apparent that there has been provided a material sensing means for sewing machines which fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed:

1. For use with a sewing machine having a throat plate over which a workpiece is progressively moved, a presser foot assembly and an apparatus for indicating when the leading and trailing ends of the workpiece travel under the presser foot assembly, said apparatus comprising:

fiber optic means capable of transmitting light and having its free end mounted for movement with the presser foot assembly;

reflective surface means provided on the throat plate and arranged opposite the free end of the fiber optic means;

a transparent insert arranged intermediate the free end of said fiber optic means and the reflective surface and which is arranged flush with a lower work engaging surface on said presser foot assembly; and means connected to the other end of said fiber optic means which are responsive to the interruption and restoration of light caused by the ends of the workpiece passing between the end of the fiber optic means and the reflective surface, said means responsive being capable of producing a signal indicative of such workpiece passage.

2. The apparatus according to claim 1 wherein the reflective surface is formed as a boss on said throat plate.

3. The apparatus according to claim 2 wherein said reflective surface on said throat plate is of greater cross-sectional area than that of the free end of said fiber optic means.

* * * * *